Nov. 30, 1965   J. J. FALK   3,220,699
TRAILER OR VEHICLE JACK
Filed Dec. 9, 1963   2 Sheets-Sheet 2
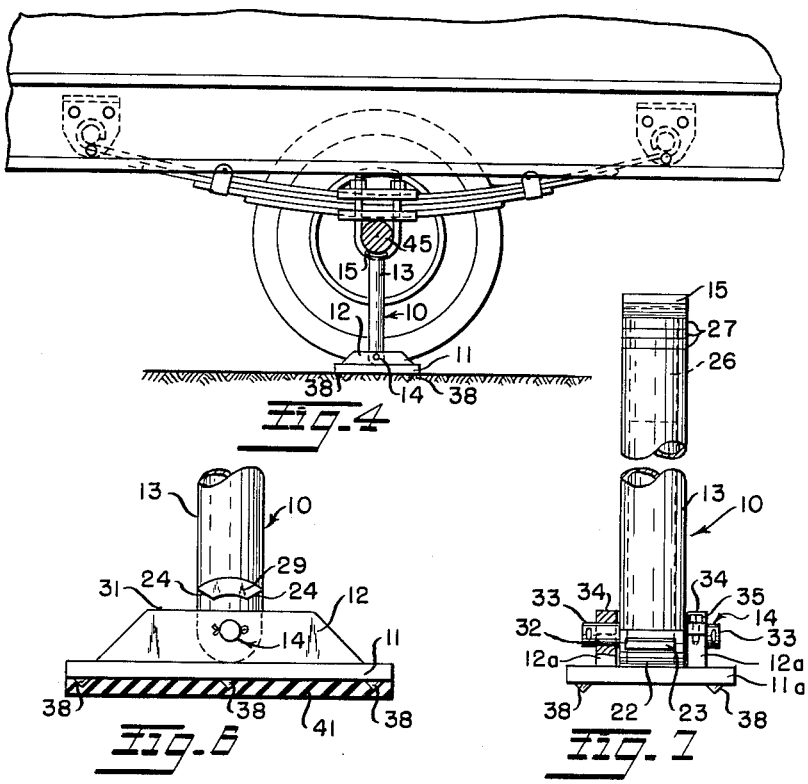
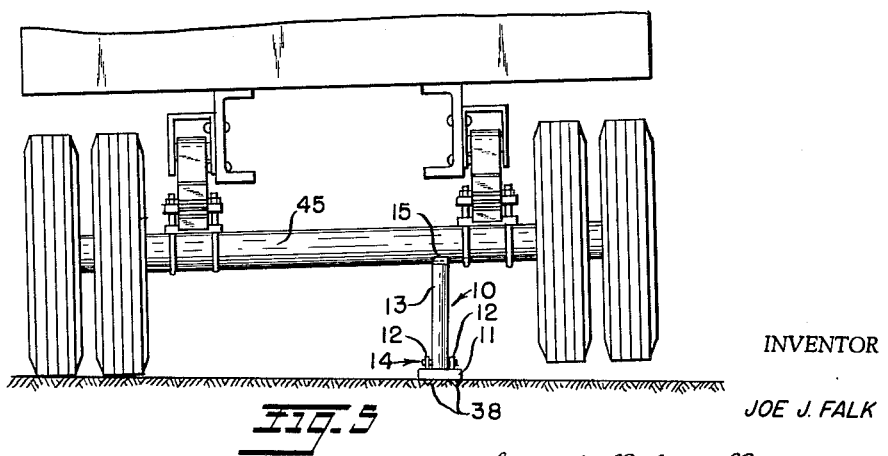
INVENTOR
JOE J. FALK
BY Strauch, Nolan & Neale
ATTORNEYS United States Patent Office 3,220,699
Patented Nov. 30, 1965

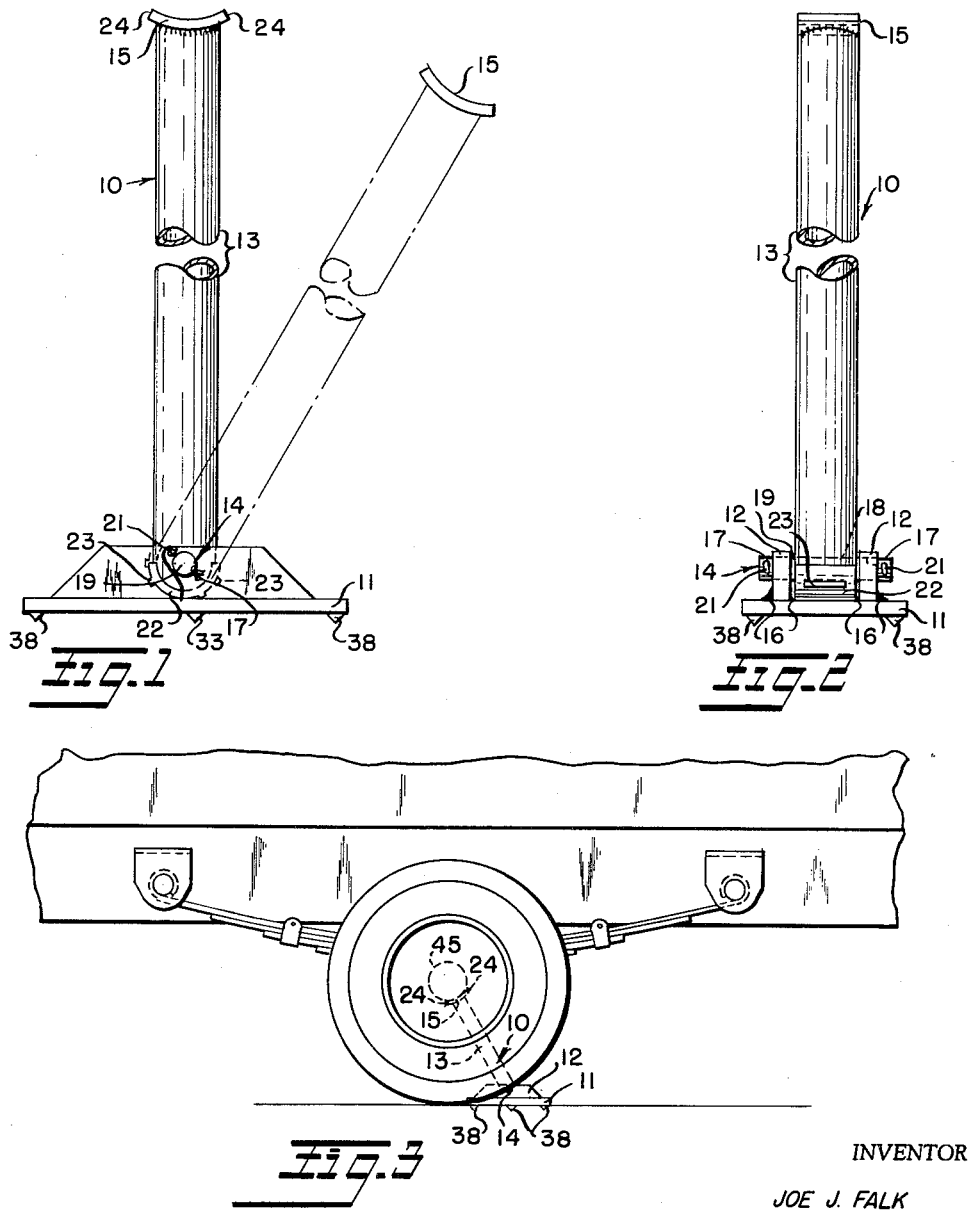

3,220,699
TRAILER OR VEHICLE JACK
Joe J. Falk, P.O. Box 162, Stewardson 3, Ill.
Filed Dec. 9, 1963, Ser. No. 328,883
9 Claims. (Cl. 254—94)

The present invention relates to vehicle jack structures to be used to raise selected wheels off the ground for wheel removal to repair or replace damaged tires or wheels and more particularly to a simple post type jack for trailer and truck use, particular dead axle jacking, in roadside emergencies in which the motor power of the vehicle can provide the jacking force required to raise the substantial weight of loaded trucks and trailers.

While post type jacks generally similar to the present jack have been proposed in the past, see United States Letters Patent 1,364,248 to J. Cavanagh dated January 4, 1921; 1,372,271 to R. B. Britton dated March 22, 1921; 1,687,503 to R. G. McKee dated October 16, 1928; 1,867,055 to J. W. Bright dated July 12, 1932, none of these prior jacks are constructed in a manner to withstand the load forces encountered in truck or trailer usage.

It, accordingly, is a primary object of the present invention to provide a simple, rugged post type jack constructed to withstand the heavy loads of truck-trailer usage and to be operated by vehicle movement under vehicle motive power.

A further object of the present invention resides in the provision of a simple post type jack composed of a ground engaging base and a pivotally swingable support post topped by an axle seat constructed so that the supported weight of the jacked vehicle is transmitted directly through the support post to the ground engaging base and bypasses the hinge mechanism.

Another object of the present invention resides in providing a vehicle jack in accord with the preceding object with stop means adapted to predetermine a normal inclined post position which assures, when positioned beneath a vehicle, an angled presentation of the axle seat to receive the vehicle axle as the vehicle is moved under its conventional motive power forwardly or rearwardly to bring the vehicle axle and the support post to a position vertically above the lateral axis of the base and the axis of the pivot connection between the base and support post.

Still further objects will appear from the following description and appended claims when read in conjunction with the appended drawings wherein:

FIGURE 1 is a side elevational view of a jack made in accord with this invention with the near base flange broken away to illustrate the main support post end cap and stop structure and illustrating in dot-dash lines the normal position of the main support post;

FIGURE 2 is an end elevational view of the jack of FIGURE 1 as viewed from the right of FIGURE 1;

FIGURE 3 is a schematic view of the jack of FIGURE 1 in position beneath a trailer at the moment that the axle enters the axle seat of the jack during backing up movement of the trailer under powered operation of the tractor;

FIGURE 4 is a schematic view similar to FIGURE 3 with the near wheel removed and illustrating the jack of FIGURE 3 in its upright position;

FIGURE 5 is a rear end view of the schematic view of FIGURE 3 showing the jack in its upright jacking position;

FIGURE 6 is a fragmental side elevational view of a jack made in accord with this invention provided with an alternate stop means; and FIGURE 7 is a fragmental end view of a jack made in accord with this invention provided with an alternate post pivot means.

With continued reference to the drawings wherein like parts are identified in the several views by the same reference numerals, the jack 10 of this invention comprises a base member 11 (FIGURES 1 to 6) or 11a (FIGURE 7) having along its opposite lateral edges upstanding flange members 12 (FIGURES 1 to 6) or 12a (FIGURE 7), a main support post 13 mounted between flanges 12 or 12a by a pivot means generally indicated by numeral 14 and an arcuate axle seat 15 welded to the upper end of post 13. In the preferred embodiment of FIGURES 1 through 5 and the further embodiment of FIGURE 6, the upstanding flangs 12 comprise separate plate members welded as indicated at 16 (FIGURE 2) to the upper face of base member 11 along the inner and outer meeting corners of the plate members. As best shown in FIGURES 1 and 2, each of the flange plate members 12 is provided with a through journal bore 17. The respective journal bores 17 are axially aligned as the flange plates 12 are welded to base member 11 to provide a first pivot means.

The lower end of the post 13 in these two forms of the invention is provided with a through bore 18 and fitted with a pivot shaft 19 to provide a second pivot means. Preferably the pivot shaft 19 is axially removably associated with through bore 18 so that the shaft 19 may be inserted axially through the journal bore 17 of one flange plate 12, then through the through bore 18 and finally through the journal bore 17 of the other flange plate 12 to pivotally connect post 13 to base member 11. Cotter pins 21 or the like are preferably inserted through the protruding ends of shaft 19 to form limit stops to prevent disassociation of shaft 19 in use of the jack.

The lower end of post 13 in the preferred embodiment of FIGURES 1 to 5, is cut to receive an arcuate cap member 22 having transversely extending, rib-like protrusions 23 formed thereon or welded thereto in predetermined angularly spaced relation. The curvature of cap member 22 and its attachment to the lower end of post 13, preferably by welding along its line of juncture with post 13, is effected so that the outer arcuate surface lies along a circular path having the axis of shaft 19 as its center and a radius barely equal to the distance between the shaft axis and the upper surface of base member 11. As a consequence, pivotal movement of post 13 relative to base member 11 is limited to an arcuate movement determined by the engagement of the respective rib-like protrusions 23 with the upper surface of base member 11. It follows, therefore, that rib-like protrusions 23 serve as limit stops to determine respective normal inclined rest positions of post 13 when base 11 is placed in position on the ground or roadway over which the vehicle to be jacked travels.

In practice, this permitted pivotal movement is predetermined to present axle seat 15, in the form of a plate or block formed with a concave, transversely directed, upwardly facing seat surface, in a suitable position to intercept the vehicle axle and be moved to its vertical jacking position as the vehicle is moved over the ground or roadway toward the previously positioned jack. Such movement of the vehicle may be most expeditiously effected by use of the vehicle engine and its drive train although it is to be understood that a coupled tractor or independent service truck may be employed for this purpose, if desired.

It will be appreciated that effective use of the jack of this invention requires that a proper relationship be established between the curvature of the axle seat 15 and the pivotal movement permitted by the limit stops 23. In one operative example illustrated by FIGURES 1 to 5 of the drawings, this relationship is established by locating the rib-like protrusions 23 so their base contacting faces lie along respective radii passing through the post pivot axis and spaced 60° to either side of the longitudinal center line of the post. With this stop arrangement, post 13 will swing between normal rest positions located at inclinations of 30° either side of the vertical jacking position of the post. With such a post pivot arrangement, the axle seat, which in all cases provides a concave axle contact face in the form of an arc generated around a center using a radius approximately equal to that of the axles to be serviced, consitutes an arcuate segment the ends 24 of which are delimited by respective radii passing through the arc center and inclined in opposite directions to the longitudinal center line of post 13 at angles of 30°. A seat so constructed will cover a 60° area of the axle and, when post 13 of appropriate length is in either of its normal rest positions, the seat end nearest the approaching axle will be disposed to lie in a plane just beneath a tangent horizontal plane drawn from the underside of the axle. This is best illustrated in FIGURE 3.

To determine the appropriate length for post 13, the radius of the tired wheel to be serviced must be known or the axle seat must be adjustably related to post 13, for example as illustrated by the embodiment shown in FIGURE 7. In this embodiment, the post 13 is shown as a hollow tube of any suitable cross-sectional configuration and the axle seat 15 is in the form of a block welded to a stem 26 which slidably telescopes into the upper end of the tube. Adjustment of the effective length of post 13 is accomplished through the use of one or more spacer rings 27 slidably associated with stem 26 and disposed between the post end and the back face of seat 15. In the other embodiment, the jack is tailor made, the post 13 being cut to predetermined length as required by the dimensions of the wheels to be serviced.

Referring to the embodiment of FIGURE 6, the only difference between it and the embodiment of FIGURES 1 to 5 is in the limit stops and the fact that the cap 22 is omitted, the lower end of the post 13 being curved along a circular path having the axis of shaft 19 as a center and a radius barely equal to the distance between the shaft axis and the upper surface of base member 11. In FIGURE 6, the limit stops take the form of a block 29 welded or otherwise fixedly secured to the opposite side walls of the tube 13. The stop faces 24 are disposed in superjacent relation to flange plates 12 so that they will alternately abut the upper flange plate edges 31 in the respective rest positions of the post 13.

Referring again to FIGURE 7, this form of the invention embodies flange plates 12a the upper edges of which are formed with semicircular journal notches or sockets 32 designed to receive stub shafts 33 welded or otherwise fixedly secured to the opposite side wall portions of post 13. Retainer caps 34 having mating semicircular notches and designed to be bolted to the flange plate upper edges by cap screws 35 complete the first pivot means in this form of the invention.

All forms of the invention are used in the same ways. Namely, the jack is positioned on the ground or pavement surface either forwardly or rearwardly of an end of the axle to be jacked and the vehicle is driven or pushed toward the jack to engage its axle with seat 15. To prevent slippage of base 11 along unpaved surfaces, the underface of the base is provided with depended triangular protuberances or teeth 38 which bite into the earth as contact is made with seat 15 and pressure is applied downwardly through post 13. While these same anti-slip protuberances would serve a similar purpose on most, if not all, paved surfaces, road authorities might object on the grounds of puncture damage to the roadways. To meet any such objection, each user could be provided with a thick vinyl, rubber or like mat 41 (FIGURE 6) to be placed beneath base 11. In the use of such a mat, the protuberances 38 will dig into the mat and press the mat into non-slipping contact with the paved surfaces.

Once the vehicle axle 45 contacts seat 15 as shown in FIGURE 3, continued vehicle movement in the desired direction, to the right in FIGURE 3, will swing the upper end of post 13 in a clockwise direction around pivot means 14 camming or lifting axle 45 upwardly as vehicle movement continues. As post 13 reaches its vertical position as shown in FIGURES 4 and 5, the driver will be signalled by an observer at the side of the vehicle to brake and stop the vehicle at which time the wheel to be removed will be raised free of the ground or pavement surface. Should it happen that the braking of the vehicle is too long delayed and post 13 swinngs past its vertical position, no damage will result since the post 13 is free to move around in a clockwise direction until it reaches its opposite rest position freeing the axle to move away from seat 15. Should this happen, it is only necessary to drive or push the vehicle in the opposite direction to reactuate the jack and bring and the vehicle to a stop at the proper time.

As heretofore pointed out, the curvature of cap 22 (FIGURES 1 to 5 and 7) or the lower end of post 13 (FIGURE 6) defines a cylindrical surface having as its center the axis of the pivot means 14 and a radius barely equal to the distance between the axis of the pivot means and the upper surface of base member 11. As a consequence, free pivoting of post 13 is assured unless the downward vehicle weight component exceeds a value that will cause a deflection of the pivot shaft 19 or stub shafts 33. Should this occur over deflection of the pivot shaft or stub shafts will be arrested by direct pressure contact between the cap or shaft end with the upper surface of base member 11. It follows, therefore, that damage to the pivot means due to over-deflection of the pivot shaft or stub shafts is automatically avoided.

In actual practice, it has been found that an efficiently operating jack for use with loaded trailers of a tractor trailer rig can be provided in accord with this invention using for post 13 a 1¾" diameter piece of black pipe about 18 inches long, a ½" base plate 10" in length and 5" wide with ½" flange plates of about 8" in length and 1½" in width and a ¾" steel pivot shaft. A jack so constructed will, when in its vertical jacking position, provide line bearing contact between cap 22 and base member 11 along a transverse line lying in a vertcial plane containing the post pivot axis.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A trailer jack for emergency road usage comprising an elongated metal ground supported base including upstanding support flanges along its opposite sides having laterally spaced and aligned first pivot means, a main support post having a second pivot means at one end adapted to cooperate with said first pivot means to form a pivot connection between said base and said support post and a generally arcuate upwardly facing axle seat at its other end disposd with its axle seat in parallel relation to the pivot axis of said second pivot means, and stop means carried by said one end of said post and disposed to abuttingly cooperate with a portion of said base upon predetermined pivotal movement of said post relative to said base in either direction around the axis of said pivot means to establish a normal inclined rest position of said support post, said support post being of a length greater than the distance between the trailer axle and the radial dimension of the trailer wheel and tire to provide wheel removal clearance when said post is in a vertical position and said first and second pivot means being so related to said upstanding flanges and said one end of said post that said one end of said post will supportingly bear on said base at least when the support post is in its vertical upright position with a trailer axle in said axle seat to thereby relieve said first and second pivot means of the supported weight of the trailer and its jacked up wheel.

2. The jack of claim 1 wherein said stop means comprises a pair of rib-like protrusions at said one end of said post disposed in annularly spaced relation along an annular path having the pivot axis as a center and a radius barely equal to the radial distance from the pivot axis to the opposing face of that portion of the base lying between said upstanding flanges.

3. The jack of claim 2 wherein the annular spacing of said pair of rib-like protrusions along said annular path is of the order of 60° with each protrusion being disposed at an equal distance from the point of intersection of the longitudinal axis of said post with said annular path to thereby determine a normal inclined rest position of said post when the base is placed on the ground forwardly or rearwardly of the axle adjacent a wheel to be jacked such that the axle seat will be disposed at an inclination to intercept the axle when the trailer is moved under tractor power in a direction to dispose the axle vertically above the ground supported base.

4. The jack of claim 1 wherein said stop means comprises protuberant members having end stop faces fixed to the opposite side walls of said post in spaced relation above said upstanding flanges at a predetermined distance such that a normal inclined rest position is provided for said post when the base is placed on the ground forwardly or rearwardly of the axle adjacent a wheel to be jacked and the respective stop faces alternately abut the upper flange edges.

5. The jack of claim 1 wherein the base is of a length sufficient to support the post in either of its normally inclined rest positions.

6. The jack of claim 1 wherein said first pivot means comprises aligned shaft bores, said second pivot means comprises shaft means having opposite ends disposed in respective ones of said shaft bores and means is provided to prevent axial disassociating movement of said shaft means from said shaft bores.

7. The jack of claim 1 wherein said first pivot means comprises upwardly opening shaft journal sockets and removable retainer caps and said second pivot means comprises shaft means fixed to the side wall of said post in opposed axial alignment.

8. The jack of claim 1 wherein said axle seat comprises a member fixed at the upper end of the main support post and having an arcuate upwardly facing axle seating surface.

9. The jack of claim 7 wherein the axle seat is welded to the upper end of the main support post.

References Cited by the Examiner
UNITED STATES PATENTS

| | | | |
|---|---|---|---|
| 270,394 | 1/1883 | Crecelius | 254—101 |
| 396,321 | 1/1889 | Baird | 254—134 |
| 485,342 | 11/1892 | Dunn | 254—101 |
| 1,687,503 | 10/1928 | McKee | 254—94 |

WILLIAM FELDMAN, *Primary Examiner.*

MILTON S. MEHR, *Examiner.*